United States Patent [19]

Bolden

[11] Patent Number: 4,714,817

[45] Date of Patent: Dec. 22, 1987

[54] METHOD AND APPARATUS FOR LOCATING AND MACHINING AN IDLE BYPASS HOLE IN A CARBURETOR BODY

[75] Inventor: Albert Bolden, Harper Woods, Mich.

[73] Assignee: USEC, Inc., Grosse Pointe Woods, Mich.

[21] Appl. No.: 916,025

[22] Filed: Oct. 6, 1986

[51] Int. Cl.$^4$ ............................................. B23K 26/00
[52] U.S. Cl. ...................... 219/121 LK; 219/121 LL; 261/41.5
[58] Field of Search ................ 219/121 LG, 121 LN, 219/121 LK, 121 LL; 261/41.5

[56] References Cited

U.S. PATENT DOCUMENTS

| | | | |
|---|---|---|---|
| 4,146,595 | 3/1979 | Szott et al. | 261/41.5 |
| 4,387,063 | 6/1983 | Pontoppidan | 261/41.5 |
| 4,539,163 | 9/1985 | Sakurai | 261/41.5 |
| 4,578,228 | 3/1986 | Gerhurdy | 261/41.5 |

*Primary Examiner*—C. L. Albritton
*Attorney, Agent, or Firm*—Cullen, Sloman, Cantor, Grauer, Scott & Rutherford

[57] ABSTRACT

The method of locating and cutting an idle bypass hole in a carburetor body having a throttle section and a normally closed pivotal throttle plate therein on a longitudinal axis which comprises adjustably and guidably mounting a carrier upon a fixture base, locating and clamping a carburetor body upon the carrier and mounting a stationary contact finger upon the base. Further steps include advancing the carburetor body until the contact finger is in firm engagement with the throttle plate, thereafter clamping the carrier to the base and successively cutting the idle bypass hole through the carburetor body upon an axis at right angles to the body axis and at a predetermined distance to a fixed axis of reference. The cutting axis is arranged at a preset critical distance from the closed throttle plate. An apparatus therefor which includes a fixture base, a reciprocal carrier guidably mounted thereon supporting a carburetor body. A fixture support upon the base mounts a control rod carrying a contact finger which on inward feed of the carrier comes into firm contact with the throttle plate. Upon clamping of the carrier to the base, a laser cutting unit having a cutting and axis at right angles to the body axis is energized. The cutting axis is at a predetermined center distance to a fixed axis of reference and arranged at a preset critical distance from the closed throttle plate.

24 Claims, 5 Drawing Figures

METHOD AND APPARATUS FOR LOCATING AND MACHINING AN IDLE BYPASS HOLE IN A CARBURETOR BODY

FIELD OF THE INVENTION

The present invention relates to carburetors for vehicles and additionally includes without limitation carburetors for garden tractors, lawn mowers, pump motors, generator motors, cement diggers, motorized trowels and golf cart motors normally employing 1, 2 to 4 cylinders.

BACKGROUND OF THE INVENTION

The exact and correct location of the idle bypass hole in a carburetor relative to the closed throttle plate within the throttle section is a critical dimension to the smooth functioning of the carburetor and the smooth transition of the engine from idle to off-idle operation without hesitation or stumbling.

Heretofore there were a number of tolerance variables which stack up in carburetor constructions, such as diameter of the throttle bore, diameter of the throttle plate, variations of the diameter of the throttle shaft and the hole size in the carburetor body for the throttle shaft, location of the center line of the throttle shaft with respect to the center line of the throttle section. All of these variables tended to produce malfunctioning of the carburetor due to a variation of this critical distance between the edge of the throttle plate where it engages the throttle section on its periphery and the location of the adjacent idle bypass hole.

Heretofore there has long existed the problem of assuring in advance that this critical dimension and location of the idle bypass hole as it is machined through the carburetor body upstream of the throttle plate is such as to produce a smooth function of the carburetor and a smooth transition of the engine from idle to off-idle operation without hesitation of stumbling.

Various efforts have heretofore been made in determining the correct location of the idle bypass hole so as to achieve a correct critical distance and specific location for the cutting axis of a laser drilling unit or cutting tool normally extending at right angles to the longitudinal axis of the carburetor body.

SUMMARY OF THE INVENTION

It is an important feature of the present invention to provide an improved method of locating and machining an idle bypass hole in a carburetor body which has a throttle section and a normally closed pivotal throttle plate therein arranged upon a longitudinal axis whereby there is cut through the carburetor body using a laser beam or other cutting tool and idle bypass hole which is exactly at the critical distance and which takes into consideration the stack-up of variables of tolerances as relating to the diameter of the throttle section, diameter of the throttle plate, variations of the throttle shaft hole size, variations of the throttle shaft diameter, location of the center line of the throttle plate support shaft and with respect to the center line of the throttle section.

It is an important feature to provide a method which provides for an absolute compensation as to the net effect of the foregoing variables and so as to produce in the carburetor body a properly located and machined idle bypass hole which is arranged exactly at the critical distance upon an axis at right angles to the longitudinal axis of the carburetor body and upstream of the throttle plate.

It is a further feature to provide a method of locating and cutting an idle bypass hole in a carburetor body such that after the laser cutting unit has been preset, pretested and the critical distances predetermined and set, a successive number of carburetors can be mounted upon the fixture and in accordance with the present method will have provided successively in each accurately located and properly machined idle bypass holes exactly arranged at the critical distance with respect to the throttle plate when closed.

Another feature is to provide an improved method of locating and machining an idle bypass hole in a carburetor body which includes adjustably mounting a carrier upon a fixture base for guided longitudinal movements and locating and clamping a carburetor body upon the carrier with its axis parallel to the direction of movement of the carrier and thereafter mounting a stationary contact finger upon the base and extending toward the carrier. Further steps include advancing the carburetor body with the throttle section progressively receiving the contact finger until it is in firm engagement with the throttle plate adjacent its periphery and thereafter clamping the carrier upon the base. A further step includes cutting by laser beam upon an axis at right angles to the longitudinal axis of the body at a predetermined center distance to a fixed axis of reference parallel to the drill axis and wherein the drill axis is arranged at a critical preset distance from the closed throttle plate where it engages the throttle section and wherein the cutting of the idle bypass hole through the carburetor body into the throttle section is upstream of the throttle plate.

An important feature of the present invention is to provide apparatus for locating and machining an idle bypass hole in a carburetor body having a throttle section on a longitudinal axis and a normally closed pivotal throttle plate within the throttle section which includes a fixture base and a carrier guidably mounted thereon for reciprocal movements. The carrier is adapted to receive and have clamped thereon a carburetor body with its axis parallel to the direction of movement of the carrier. A fixed support upon the base is spaced from the carrier and mounts an elongated control rod having a longitudinal axis parallel to and laterally displaced from the body axis and mounting a control finger at its free end. Means are employed for moving the carrier and carburetor body to axially receive the contact finger until it is in firm contact with the throttle plate adjacent its periphery after which the carrier is clamped to the fixture base. A laser cutting unit is then energized and wherein the axis of the laser beam is at right angles to the body axis and at a predetermined center distance to a fixed axis of reference parallel to the cutting axis and relative to the mounting of the contact finger and wherein the cutting axis is arranged at a preset critical distance from the closed throttle plate for successively cutting by laser beam an idle bypass hole through the carburetor body into the throttle section upstream of the throttle plate.

It is another feature to provide an improved method and apparatus for locating and forming by a laser beam an idle bypass slot in a carburetor body parallel to its longitudinal axis, wherein one end of the slot is located at a critical distance downstream of the throttle plate and the other end of the slot is located at a critical distance upstream of the throttle plate.

These and other objects and features will be seen from the following specification and claims in conjunction with the appended drawings:

THE DRAWINGS

It will be understood that the above drawings illustrate merely a preferred embodiment of the present method and apparatus, and that other steps and other apparatus is contemplated within the scope of the claims hereafter set forth.

DETAILED DESCRIPTION OF AN EMBODIMENT OF THE INVENTION

Figure 1:
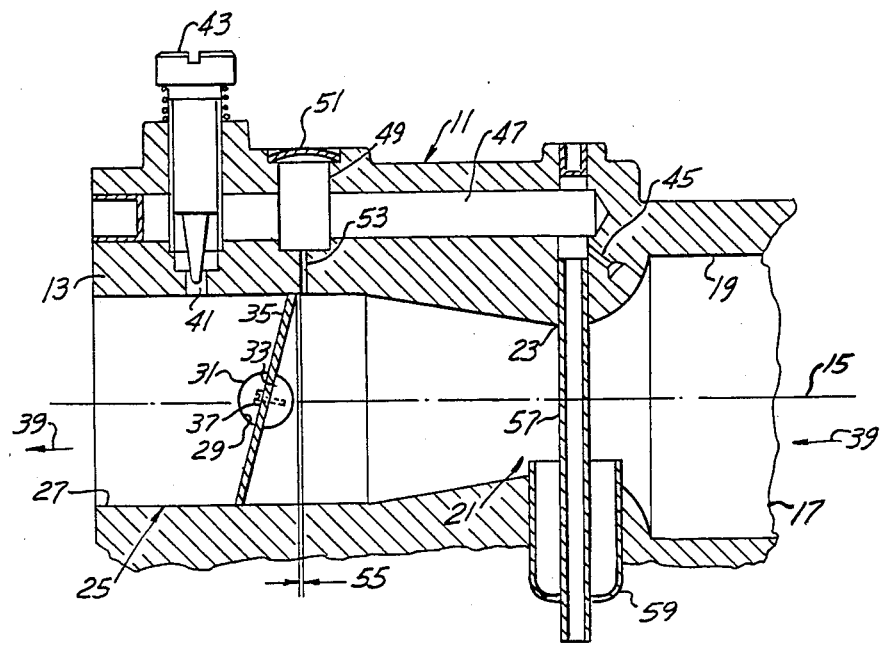
FIG. 1 is a fragmentary schematic longitudinal section of a portion of a carburetor body illustrative of the proper locating and cutting of the idle bypass hole with respect to a closed throttle plate.

Referring to the drawing, FIG. 1, there is schematically and fragmentarily shown a carburetor 11 having a body 13 which includes choke section 17 including bore 19, venturi section 21, including a minimum or reduced bore 23 and throttle section 25 including a throttle bore 27 of uniform diameter, all arranged upon longitudinal axis 15.

Transversely of said body on axis 15 is a throttle shaft bore 29 within which is rotatively mounted throttle shaft 31 having a flat central portion 33 over which is centrally mounted the elliptically shaped throttle plate 35. Said plate is shown in a fully closed position in FIG. 1, and secured upon the throttle shaft by fastener 37.

Air flow through the carburetor body and through the respective choke section, venturi section and throttle section is in the direction of arrows 39. As is part of a conventional construction, there is a radial idle hole 41 formed in body 13, controlled by conventional idle mixture adjusting needle 43. Idle bleed hole 45 in said body extends angularly from venturi section 21 for communication into idle fuel channel 47 which is bored through the body in normal communication with idle hole 41.

There is formed within body 13 a standard idle bypass port 49 which is normally open for machining of the idle bypass hole 53, after which it is closed by welsh plug 51.

The idle bypass hole 53 is machined radially through the body from the idle bypass port 49 and into the throttle section 25 upstream of the closed throttle plate 35. This is normally a cut hole accomplished by a laser cutting unit, such as schematically shown at 141 in FIG. 2. Said unit includes the radial sleeve element 143. A laser beam 145 is adapted for projection along the right angular cutting axis 146 into the idle bypass port 49 for forming or cutting the idle bypass hole 53, which is the subject of the present invention.

It is the accurate locating and cutting of the idle bypass hole 53 at the critical distance 55 upstream from the closed throttle plate 35, shown in FIG. 1, which is important to the present invention. The locating device provides the identical location of the by-pass opening relative to the throttle plate in each carburetor body machined despite tolerance stack-ups, component part size and fit variences.

There is employed in conjunction with an apertured bushing 143 or the like, a laser beam 145 for cutting the idle bypass hole 53 radially through the body for communication between idle bypass port 49 and the interior of throttle section 25.

In the illustrative embodiment, the idle bypass hole is approximately 0.020 inches in diameter and is normally in the range of 0.015 to 0.030 inches, for illustration. This is achieved in FIG. 2 by a laser beam which will cut radially through the body 13 for defining the bypass hole 53, shown in FIGS. 1 and 2.

The critical dimension 55 is illustrated in FIG. 1, being the distance between the edge of the throttle plate 35 where it engages the throttle section and the near edge of idle bypass hole 53. This critical distance may be in the range of 0.000 to 0.010 inches or in the range of 0.000 to 0.020 inches and an average distance of 0.010 inches plus or minus 0.005 inches.

This dimension between the edge of the throttle plate and the edge of the idle bypass hole is critical to the smooth functioning of the carburetor and the smooth transition of the engine from idle to off-idle operation without hesitation or stumbling. This dimension is commonly held to a tolerance of ±0.005 inches or closer.

In normal operation with the throttle plate fully closed, FIG. 1, there is a combustible mixture delivered through the idle fuel channel 47 to the idle hole 41 under the control of the idle mixture adjusting needle 43 for idling of the engine. Just as soon as there is some initial small opening of the throttle plate from where it is seated closed in FIG. 1, combustible mixture will pass through the idle bypass hole 53 into venturi section 25 at its maximum diameter, adjacent the throttle plate and will pass around the perimeter of the throttle plate and into the throttle section 25 downstream of said throttle plate. Upon such sufficient opening of the throttle plate 35, being then a path of least resistance, essentially the combustible mixture passing through the idle fuel channel 47 passes through the idle bypass hole 53 for direction into said throttle section.

As shown in FIG. 1, passing through the portion of the venturi section of minimum diameter at 23 there is an idle fuel lift tube 57 for delivering fuel from source below to the idle fuel channel 47.

Concentrically arranged with respect to idle fuel lift tube 57 is the conventional main fuel nozzle 59 which communicates with the minimum diameter portion 23 of the venturi section and at its outer end communicates with a conventional fuel source for delivery of fuel for mixture with the flow of air through the choke section 17. Increased amounts of fuel pass through the main nozzle 59 as the throttle valve progressively opens for acceleration of the engine controlled by the carburetor.

The dimension 55 is a critical dimension, namely the distance between the throttle plate 35 where it engages the body when closed and the adjacent side of idle bypass hole 53. In accordance with the present invention there is provided a method by which there is an accurate location of the carburetor body with respect to the laser machining unit 141, 143 in order to assure that once preset by apparatus as illustrated in FIGS. 2 and 3, the corresponding idle bypass hole 53 will be accurately located and cut at the critical dimension 55, FIG. 1.

Figure 2:
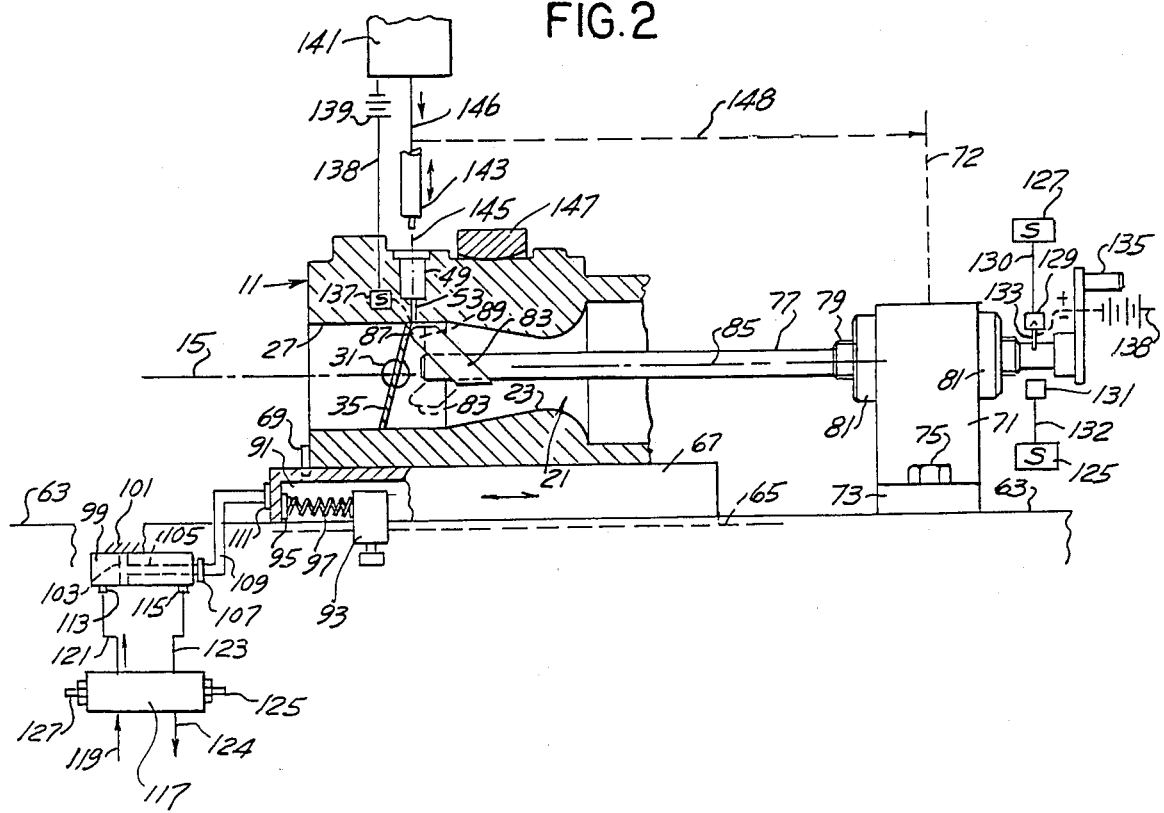
FIG. 2 is a schematic fragmentary diagram one form of apparatus using a rear mounted contact finger.
Figure 3:
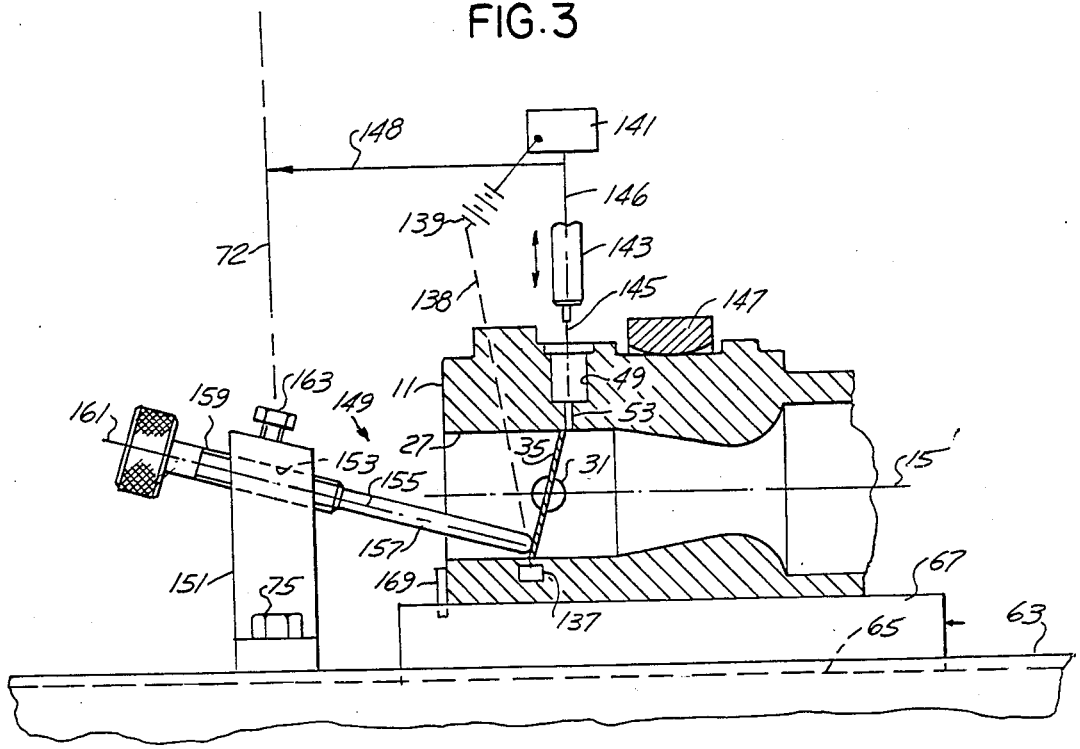
FIG. 3 is a similar view front mounted contact finger apparatus.

Schematically shown in FIG. 2 is one form of fixture apparatus, sometimes referred to as including a rear mounted contact finger, which includes a fixture base 63, fragmentarily shown, within which are formed accurate slotted guides 65 within which is guidably and movably positioned carburetor carrier 67. Upon the carrier is positioned carburetor 11 as above described, FIG. 1. Utilizing a plurality of locating pins 69, one of which is shown in FIG. 2, the carburetor body 13 is accurately positioned upon carrier 67 secured thereto by a suitable clamp, such as shown at 147 for illustration.

In the illustrative embodiment, the longitudinal axis 15 for the carburetor body is positioned in FIG. 2 as the body is supported upon the carrier 67 so that said axis is parallel to the direction of feed movement of carrier 67 within guides 65.

The upright fixed contact finger support 71 is mounted upon fixture base 63 and includes hold down flanges 73 with fasteners 75 for fixedly anchoring support 71 upon the fixture base.

Elongated control rod 77 adjacent one end extends through and is mounted upon finger support 71. Control rod 77 includes a turn screw sleeve 79 which extends through and outwardly of the sides of support 71. A pair of opposed jamb nuts are threaded over said turn screw sleeve and are in operative securing engagement with opposite sides of said support, for anchoring the contact rod against longitudinal movement.

Contact finger 83 is mounted upon and extends angularly outward from one end of control rod 77 at an acute angle thereto and suitable secured thereto as by welding. Said finger has an initial position shown in dash lines, and a gaging position shown in solid lines in FIG. 2. Essentially the contact finger 83 extends from rod 77 at an acute angle of approximately 45°, for illustration, relative to the longitudinal rod axis 85.

In the assembly of the apparatus shown in FIG. 2 with the carrier 67 retracted from the position shown, contact rod 77 and the connected control finger 83 extend toward carrier 67 with longitudinal axis 85 parallel to and laterally displaced from carburetor body axis 15. The forward end portion 87 of contact finger 83 is U-shaped in plan and includes a clearance slot 89 so that during cutting of the idle bypass hole 53 the laser beam 145 will pass within U-shaped contactor 87.

Carrier 67 as fragmentarily shown, is undercut at 91. Adjustable spring stop 93 is set within a corresponding slot within fixture base 63. Spring holder 95 upon the interior of carrier 67 receives and supports one end of compression spring 97. Said spring extends in the direction of feed movement of carrier 67 as designated by the arrow in FIG. 2. Thus in the assembly of carrier 67 and its movement towards the stationary contact finger 83, the spring 97 will initially engage adjustable spring stop 93.

In operation, in FIG. 2, the contact finger 83 as shown in solid lines, as in an interference position with respect to the reduced diameter venturi portion 23 of the venturi section 21 of the carburetor. Accordingly, for the initial assembly of contact finger 83 into the venturi section 21, rod 77 is rotated approximately 180° to the dash line position shown at 83. In view of the lateral displacement of axis 85 with respect to body axis 15, with such rotation, the relative inward feed of carrier 67 will cause the contact finger 83 as shown in dash lines to freely move through the reduced diameter venturi section 23 of the carburetor body. Thereafter, shaft 77 is rotated 180° approximately, back to the position shown in solid lines. This normally occurs before contact finger 83 is in snug, firm engagement with throttle plate 35.

Any suitable means may be employed for moving carrier 67 longitudinally upon guide 65 towards contact finger 83. This may be by hand initially and may be followed as in the illustrative embodiment by the operation of the cylinder assembly which includes air cylinder 99, suitably mounted at 101 upon fixture base 63.

Said cylinder includes piston 103 with piston rod 105 which projects from the cylinder and by connector 107 joins bracket 109 which is connected at 111 to one end of carburetor carrier 67. In the illustrative embodiment, the cylinder, which is preferably an air cylinder, includes at its opposite ends the alternately usable ports 113 and 115 with delivery of pressurized air thereto controlled by the four-way valve 117, schematically shown, connected to a source of pressurized air at 119.

Spaced conduits 121 and 123 respectively interconnect outlet ports of the control valve 117 with the respective cylinder ports 113 and 115. The operation of the control valve in the illustrative embodiment is under the control of solenoids 125 and 127 at opposite ends of the control valve.

As schematically shown in FIG. 2, adjacent the handle end of shaft 77 are a pair of contacts 129 and 131 respectively connected as by the leads 130 and 132 to the corresponding solenoids 127 and 125 for control valve 117. The switches 129 and 131 may be limit switches and are adapted for alternate connection with the electrically powered contactor 133 mounted upon rod 77 and connected to a source of electrical power as at 138.

Mounted upon one end of control rod 77 is the eccentric handle 135. Initially before the carrier 67 has been moved towards the contact finger 83 handle 135 is rotated approximately 180° so that the contact finger is in the dash line position shown at 83, FIG. 2. In such position the powered contactor 133 is in engagement with the switch 131 for activating solenoid 125. This controls the movable member of the control valve 117 so that conduit 121 is pressurized for pressurizing the outer end of cylinder 99. This effects an inward feed to the right of piston rod 105 and corresponding inward feed movement of carrier 67.

Just as soon as contact finger 83 in the dash line position shown has passed through the constricted venturi section 23, handle 135 is rotated approximately 180° back towards the initial position shown in FIG. 2 so that the contact finger is in an upright position for firm contact engagement with throttle plate 87 at the periphery thereof. This will stop inward feeding of cylinder assembly at 99, 105.

In the position of the contactor 87 of contact finger 83 firmly against throttle plate 35 at its periphery, the contactor, preferably constructed of an inductive material, acts upon proximity switch 137 which through the lead 138 and power source 139 activates laser cutting unit 141, 143, 145.

As shown in FIG. 2 schematically, the laser unit 141, anchored in a stationary position upon a suitable support, includes a fixed location sleeve 143 adapted for feeding down into idle bypass port 49, FIGS. 1 and 2. There is a corresponding power control of laser cutting unit 145 on cutting axis 146 which is at right angles to body axis 15 for cutting the idle bypass hole 53 in said body which communicates with throttle section 25.

Before the cutting laser beam is energized, after the carrier and the carburetor body 13 have been fed so that the contact finger 83 is in firm engagement with the closed throttle plate 35 at one peripheral edge thereof, the assembled carburetor body and carrier 35 are suitably clamped as at 147 to fixture base 63.

Therefore, as soon as there has been a firm contact engagement of the finger plate 83 with the closed throttle plate, FIG. 2, the power laser cutting unit 141 is energized and there is such sufficient radial inward feed along the axis 146 as will cause immediate feeding of cutting beam 145 in a conventional manner into body 13 radially inward of idle bypass port 49 for forming idle bypass hole 53.

It is contemplated there will be focused a suitable laser beam 145 for cutting idle bypass hole 53.

In the original set up of the stationary laser machining unit 145 or other cutter and the arrangement of cutting axis 146 at right angles to body axis 15, said laser beam axis is arranged at a predetermined, preset or fixed center distance 148 with respect to a central axis of reference 72. Said axis is parallel to the cutting axis and extends centrally through support 71 in the illustrative embodiment.

It is important that there be an exact setting of the center distance 148 between the cutting axis 146 and the axis of reference 72 such that when the contact finger 83 is in firm contact with the closed throttle plate, carburetor body 13 will be so positioned upon and clamped upon carrier 67 and with respect to fixture base 63 that the laser machining unit 141, 143, 145 will be at a preset critical dimension 55 with respect to the upstream contact edge of closed throttle plate 35.

FIG. 3 shows a modified apparatus corresponding to a front mounted contact finger at 149 where in conjunction with the corresponding carrier 67 within guides 65 upon the fixture base 63 there is arranged a fixed contact finger support 151 whose flanged base is anchored and secured at 75 to fixture base 63 and normally spaced from said carrier.

Formed through the upper end of the contact finger support is a threaded bore 153 inclined downwardly at an acute angle to the body axis 15 which receives the threaded portion 159 of elongated contact finger 157 having a longitudinal axis 155 similarly inclined downwardly at an acute angle with respect to axis 15, FIG. 3.

Handle 161 upon the outer end of contact finger 157 provides for rotative adjustment of the contact finger for establishing the correct center distance 148 between drill axis 146 and the fixed reference axis 72 as is required for accurately cutting or forming by laser beam the idle bypass hole 53. Once adjusted, the contact finger 157 is secured in position by set screw 163, sometimes referred to as set screw means.

In the original set-up of contact finger 155 by trial and error to the correct position, the carrier 67 is normally in a retracted position relative to the contact finger in anticipation of a drilling or cutting function.

The construction of the carrier 67 is the same as above described with respect to FIG. 2. The carrier 67 may be fed in the direction of the arrow shown in FIG. 3 manually and additionally as by a pneumatic cylinder assembly 99, as schematically shown in FIG. 2.

The operation is the same that there will be such longitudinal inward feeding of carrier 67 upon the guides 65 of fixture base 63 until the contact finger 157 is in firm engagement with throttle plate 35 adjacent one peripheral edge, FIG. 3. At that time, inward feeding stops and the carburetor body 13 as secured upon the carrier 67 is clamped upon the fixture base 63 at 147.

At the same time as firm contact is made of contact finger 157 with throttle plate 35, a switch, such as proximity switch 137 through lead 138 and power source 139 operates the power laser cutting unit 141 in the same manner as above described. This causes inward feed of bushing 143 on axis 146 into the corresponding idle bypass port 49 until the focused laser beam 145 is in registry with body 13 for cutting idle bypass hole 53. Here also as in FIG. 2, apparatus is provided so as to preserve the critical distance 55 shown in FIG. 1, being the distance upstream between the closed throttle plate and the edge of idle bypass hole 53.

In the illustrative embodiment, the critical distance is in the range of 0.005 to 0.025", and the preferred diameter is 0.010 inches, ±0.005 inches, approximately. There may be some situations where this critical distance could be approximately zero with the idle bypass hole directly adjacent the throttle plate when in its closed position in registry with the body of the carburetor within throttle section 25.

USE OF THE IDLE BYPASS HOLE LOCATING FIXTURE

Initially, the throttle shaft 31 and the throttle plate 35 are assembled in the carburetor body 13 assuring that the throttle will close fully as shown in FIG. 1. All other machining operations will ordinarily be completed before drilling idle bypass hole 53.

As a first step, the carburetor 11 is mounted upon the movable carrier 67 using locating pins 69 or other accurate locating method and clamped thereon in a conventional well-known manner using a clamp similar to the clamp shown at 147, for illustration. In the assembly of the carburetor body, FIG. 2, its axis 15 is arranged so as to be parallel to the direction of feed movement of carrier 67 within guides 65. A further step includes movement of the carburetor body firmly against contact finger 83 or 157, FIGS. 2 and 3, respectively.

In the case of the rear mounted contact finger 83, FIG. 2, contact finger 83 must be turned down to the dash line position shown at 83, in order for the venturi 23 to pass the contact finger and thereafter the contact finger is turned to the solid line up position using handle 135. When firm contact is obtained, the movable carrier 67 with the carburetor body clamped thereon is clamped to fixture base 63 as by the clamp or clamps 147. The idle bypass hole 53 is now cut applying the power laser drill 141 of FIG. 2.

After making test parts to accurately set contact fingers 83 of FIG. 2 or 157 of FIG. 3, the carburetors as machined will successively come off the fixture with the idle bypass holes 53 consistently in the correct relationship as designated by the critical distance 55 of FIG. 1 relative to throttle plate 35.

Either of the apparatus shown in FIGS. 2 or 3 may be operated fully manually or partially automated or fully automated such as shown for illustration in the schematic illustration of the power feed assembly and cylinder assembly 99 of FIG. 2 which may be applied to the apparatus of FIG. 3.

After initially setting up the apparatus for calibrating the fixture a hole is cut by laser beam. If the hole is not at the correct critical distance 55, FIG. 1, that hole is plugged and the fixture is recalibrated and a second hole is cut and so on until the fixture is correctly calibrated for properly locating the laser cutting unit 145. This is particularly for advance setting of the center distance 148, shown in FIGS. 2 and 3 between cutting axis 146 and the fixed axis of reference 72, which is a stationary axis.

Should there be a need to make some modification of the center distance 148, the apparatus in FIG. 2 can be modified by loosening the jamb nuts 81 and rotatively adjusting the threaded sleeve 79 to obtain a longitudinal adjustment of rod 77 in one direction or another, after which the jamb nuts are tightened with respect to support 71. Thus the rod 77 is limited against longitudinal movement but is free for limited rotary movement under the control of handle 135.

In operation, after laser beam cutting of hole 53 has been completed there can be such additional or sufficient rotation of rod 77 through handle 135 as will bring the contactor 133 against the switch or limit switch 129 for operating solenoid 127 on control valve 117. The set-up is such that the fluid connections are reversed pressurizing cylinder port 115 so that piston 103 will retract causing a corresponding retraction of carrier 67 with respect to contact finger 83 of FIG. 2 or the contact finger 157 of FIG. 3.

Figure 4:
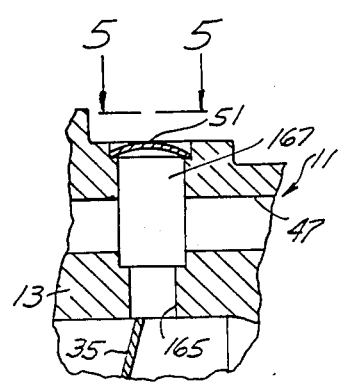
FIG. 4 is a fragmentary view similar to FIG. 1, of a portion of a carburetor body illustrative of the locating and forming by laser beam of an idle bypass slot relative to a closed throttle plate.
Figure 5:
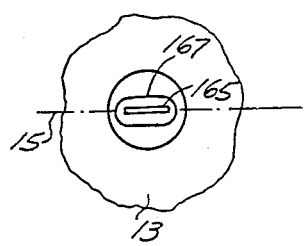
FIG. 5 is a fragmentary plan view taken in the direction of arrows 5—5 of FIG. 4.

For some carburetor models, instead of the idle bypass hole 53 of FIG. 1, an idle bypass slot 165, FIGS. 4 and 5, is more effective. In the carburetor body 13, the idle bypass port 167 is elongated and of general oval shape and aligned with axis 15.

Elongated idle bypass slot 165 is cut by a laser beam and is 0.010 inches wide and up to 0.200 inches long, for illustration, and is parallel to body axis 15.

Critical distances defined are different in that the leading edge of slot 165 is downstream of throttle plate 35, FIG. 4. The trailing edge of idle bypass slot 165 is at a critical distance upstream of the closed throttle plate.

The apparatus employed for accurately locating the carburetor body relative to the cutting or laser beam head 143 is the same as above described with respect to FIGS. 2 and 3. This assures proper location of the finished idle bypass slot 165, FIGS. 4 and 5.

Wherever a machined hole is mentioned as an idle bypass hole, it is contemplated as equivalent that such hole may be replaced for certain carburetor models by a slot where the slot is found to be more effective.

Having described my invention, reference should now be had to the following claims.

I claim:

1. The method of locating and cutting an idle bypass hole in a carburetor body having a venturi section and a throttle section on a longitudinal axis and a normally closed pivotal throttle plate within the throttle section, comprising:

adjustably mounting a carrier upon a fixture base for guided longitudinal movements thereon;
   locating and clamping a carburetor body upon the carrier with its axis parallel to the direction of movement of the carrier;
   mounting a stationary contact finger upon said base extending toward said carrier;
   advancing said carburetor body with said venturi section and throttle section progressively receiving said contact finger until said contact finger is in firm engagement with said throttle plate adjacent its periphery;
   clamping the carrier upon the base;
   fixedly mounting a power laser cutting unit having a bushing and a focused laser beam on a cutting axis at right angles to said longitudinal axis and at a predetermined center distance to a fixed axis of reference parallel to the cutting axis relative to the mounting of said contact finger;
   said cutting axis being arranged at a preset critical distance from the closed throttle plate where it engages the throttle section; and
   successively cutting an idle bypass hole through said carburetor body into said throttle section upstream of said throttle plate.

2. In the method of claim 1, said contact finger being mounted upon one end of and projecting at an acute angle from an elongated control rod having a longitudinal axis parallel to and laterally displaced from said body axis;
   initially rotating said contact finger 180°, approximately, before advancing said venturi section over said contact finger passing said contact finger through said venturi section;
   and successively rotating said contact finger 180°, approximately, for engaging registry with the near side of said throttle plate.

3. In the method of claim 1, said control finger being mounted upon one end of and projecting from an elongated rotatable control rod having a longitudinal axis parallel to and spaced from said body axis;
   the further step of adjustably mounting and anchoring the control rod upon a fixed support for limited adjustments along its axis, for accurately positioning the control finger so that successive carburetors clamped to said carrier will come off the fixture base with the idle bypass hole consistently at said critical distance.

4. In the method of claim 1, automatically energizing said power laser cutting unit upon firm engagement of said contact finger with said throttle plate.

5. In the method of claim 1, said advancing said body including power feeding said carrier along said fixture base.

6. The method of locating and cutting an idle bypass hole in a carburetor body having a venturi section and a throttle section on a longitudinal axis and a normally closed pivotal throttle plate within the throttle section, comprising:

adjustably mounting a carrier upon a fixture base for guided longitudinal movements thereon;
   locating and clamping a carburetor body upon the carrier with its axis parallel to the direction of movement of the carrier;
   mounting a stationary contact finger upon said base extending towards said carrier and inclined at an acute angle to said axis;
   advancing said carburetor body with said throttle section progressively receiving said contact finger until said contact finger is in firm engagement with said throttle plate adjacent its periphery on one side hereof;
   clamping the carrier upon the base;
   fixedly mounting a power laser cutting unit having a bushing and focused laser beam on a cutting axis at right angles to said longitudinal axis and at a predetermined center distance to a fixed axis of reference parallel to said cutting axis and relative to the mounting of said contact finger;

said cutting axis being arranged at a preset critical distance from the closed throttle plate at the diametrically opposite side of its periphery; and successively cutting an idle bypass hole through said carburetor body into said throttle section upstream of said throttle plate.

7. In the method of claim 6, the further step of longitudinally adjusting and anchoring the contact finger upon a fixed support for limited longitudinal adjustments along its axis, for accurately positioning the control finger so that successive carburetors clamped to the carrier will come off the fixture base with the idle bypass hole consistently at said critical distance.

8. In the method of claim 6, said advancing said body including power feeding said carrier along said base.

9. In the method of claim 6, the further step of automatically energizing said power laser cutting unit upon firm engagement of said contact finger with said throttle plate.

10. Apparatus for locating and drilling the idle bypass hole in a carburetor body having a venturi section and a throttle section on a longitudinal axis and a normally closed pivotal throttle plate within the throttle section comprising:

a fixture base;

a carrier guidably mounted upon the base for reciprocal longitudinal movement thereon;

said carrier adapted to receive and have clamped thereon a carburetor body with its axis parallel to the direction of movement of the carrier;

a fixed support secured to said base and spaced from said carrier;

an elongated control rod at one end journaled and supported upon said support and having a longitudinal axis parallel to and laterally displaced from said body axis;

a contact finger mounted upon and projecting angularly forward of said rod at its other end;

means for moving said carrier and carburetor body to axially receive said contact finger until it is in firm contact with said throttle plate adjacent its periphery;

means clamping said carrier upon said fixture base;

and a power laser cutting unit having a bushing and a focused laser beam on a cutting axis at right angles to said body axis, at a predetermined center distance to a fixed axis of reference parallel to the cutting axis and relative to the mounting of said contact finger; said cutting axis being arranged at a preset critical distance from the closed throttle plate for successively cutting an idle bypass hole through the carburetor body into the throttle section upstream of said throttle plate.

11. In the apparatus of claim 10, said control rod and contact finger being initially rotated 180°, approximately, before advancing said venturi section over said contact finger for passing said contact finger through said venturi section;

said control rod and contact finger being successively rotated 180°, approximately, so that said contact finger is adapted to engage the upstream side of said throttle plate adjacent its periphery.

12. In the apparatus of claim 10, said contact finger being U-shaped in plan at one end defining a clearance opening for said laser beam.

13. In the apparatus of claim 11, an eccentric handle upon one end of said control rod for selectively rotating it up to 180°.

14. In the apparatus of claim 10, said carrier being undercut;

a stop on said fixture base extending into said undercut;

and a coiled compression spring at one end mounted upon said carrier and extending in the direction of its movement for operative engagement with said stop.

15. In the apparatus of claim 11, said means for moving said carrier including a cylinder assembly having a piston rod connected to said carrier adapted to alternately advance and retract said carrier.

16. In the apparatus of claim 15, a four-way valve connected to a power source and having a pair of outlets connected to opposite ends of said cylinder;

a pair of alternately operable solenoids on opposite ends of said valve for controlling the feed of pressure fluid through its outlets alternately;

a pair of switches connected to said solenoids respectively;

and an electrically powered connector on said rotatable control rod adapted for alternate engagement with said switches for intermittently energizing said valve for successively feeding and retracting said carrier.

17. In the apparatus of claim 10, a normally open electrical circuit including a power source connected to said power laser cutting unit;

and a proximity switch in said circuit adjacent said contact finger inductively energized when said contact finger is in firm engagement with said throttle plate for energizing said laser cutting unit.

18. Apparatus for locating and cutting the idle bypass hole in a carburetor body having a venturi section and a throttle section on a longitudinal axis and a normally closed pivotal throttle plate within the throttle section comprising:

a fixture base;

a carrier guidably mounted upon the base for reciprocal movements thereon;

said carrier adapted to receive and have clamped thereon a carburetor body with its axis parallel to the direction of movement of the carrier;

a fixed support secured upon said base spaced from said carrier;

an elongated front mounted contact finger journaled and adjustably secured upon said support and having a longitudinal axis inclined downwardly toward said carrier at an acute angle to said body axis;

means for moving said carrier and carburetor body to receive said contact finger until it is in firm engagement with said throttle plate adjacent its periphery;

means clamping said carrier to said fixture base;

and a power laser cutting unit having a bushing and a focused laser beam arranged upon a cutting axis at right angles to said body axis and at a predetermined center distance to a fixed axis of reference parallel to said cutting axis and relative to the mounting of said contact finger;

said cutting axis being arranged at a preset critical distance from the closed throttle plate, where it engages the throttle section for successively cutting an idle bypass hole through said carburetor body into the throttle section upstream of said throttle plate.

19. In the apparatus of claim 18, said contact finger having a threaded portion intermediate its ends threaded through a corresponding angular bore in said support;

a handle on one end of said contact finger for rotating said finger and for advancing and retracting said finger for presetting said center distance;

and set screw means upon said support for frictionally anchoring said contact finger in adjusted position.

20. In the apparatus of claim 18, said carrier being undercut;

a stop upon said fixture base extending to said undercut;

and a coiled compression spring at one end mounted upon said carrier and extending in the direction of its movement for operative engagement with said stop.

21. In the apparatus of claim 18, said means for moving said carrier including a cylinder assembly having a piston rod connected to said carrier adapted to alternately advance and retract said carrier.

22. The method of locating and forming an idle bypass slot in a carburetor body having a venturi section and a throttle section on a longitudinal axis and a normally closed pivotal throttle plate within the throttle section, comprising:

adjustably mounting a carrier upon a fixture base for guided longitudinal movements thereon;

locating and clamping a carburetor body upon the carrier with its axis parallel to the direction of movement of the carrier;

mounting a stationary contact finger upon said base extending toward said carrier;

advancing said carburetor body with said venturi section and throttle section progressively receiving said contact finger until it is in firm engagement with said throttle plate adjacent its periphery;

clamping the carrier upon the base;

fixedly mounting a laser beam assembly having a beam axis at right angles to said longitudinal axis and at a predetermined center distance to a fixed axis of reference parallel to the beam axis relative to the mounting of said contact finger;

said beam axis being arranged at a preset critical distance from the closed throttle plate where it engages the throttle section; and successively cutting an idle bypass slot through said carburetor body into said throttle section with the leading edge of said slot downstream of said throttle plate and portions of said slot upstream thereof.

23. The method of locating and forming an idle bypass slot in a carburetor body having a venturi section and a throttle section on a longitudinal axis and a normally closed pivotal throttle plate within the throttle section, comprising;

adjustably mounting a carrier upon a fixture base for guided longitudinal movements thereon;

locating and clamping a carburetor body upon the carrier with its axis parallel to the direction of movement of the carrier;

mounting a stationary contact finger upon said base extending towards said carrier and inclined at an acute angle to said axis;

advancing said carburetor body with said throttle section progressively receiving said contact finger until said contact finger is in firm engagement with said throttle plate adjacent its periphery on one side thereof;

clamping the carrier upon the base;

fixedly mounting a laser beam assembly having a beam axis at right angles to said longitudinal axis and at a predetermined center distance to a fixed axis of reference parallel to said beam axis and relative to the mounting of said contact finger;

said beam axis being arranged at a preset critical distance from the closed throttle plate at the diametrically opposite side of its periphery; and successively cutting an idle bypass slot through said carburetor body into said throttle section with the leading edge of the slot downstream of said throttle plate and portions of said slot upstream thereof.

24. Apparatus for locating and forming an idle bypass slot in a carburetor body having a venturi section and a throttle section on a longitudinal axis and a normally closed pivotal throttle plate within the throttle section comprising;

a fixture base;

a carrier guidably mounted upon the base for reciprocal longitudinal movement thereon;

said carrier adapted to receive and have clamped thereon a carburetor body with its axis parallel to the direction of movement of the carrier;

a fixed support secured to said base and spaced from said carrier;

an elongated control rod at one end journaled and supported upon said support and having a longitudinal axis parallel to and laterally displaced from said body axis;

a contact finger mounted upon and projecting forward of said rod at its other end;

means for moving said carrier and carburetor body to axially receive said contact finger until it is in firm contact with said throttle plate adjacent its periphery;

means clamping said carrier upon said fixture base;

and a laser beam assembly having a beam axis at right angles to said body axis, at a predetermined center distance to a fixed axis of reference parallel to the beam axis and relative to the mounting of said control rod; said beam axis being arranged at a preset critical distance from the closed throttle plate for successively cutting an idle bypass slot through the carburetor body into the throttle section with its leading edge downstream of said throttle plate.

* * * * *